United States Patent
Annavajjala et al.

(10) Patent No.: US 8,483,387 B2
(45) Date of Patent: Jul. 9, 2013

(54) METHOD FOR GENERATING PRIVATE KEYS IN WIRELESS NETWORKS

(75) Inventors: Ramesh Annavajjala, Quincy, MA (US); Wei Liu, Syracuse, NY (US); Chunjie Duan, Brookline, MA (US); Toshiaki Koike-Akino, Cambirdge, MA (US); Yige Wang, Natick, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 227 days.

(21) Appl. No.: 12/962,449

(22) Filed: Dec. 7, 2010

(65) Prior Publication Data

US 2012/0140922 A1 Jun. 7, 2012

(51) Int. Cl.
*H04L 29/06* (2006.01)

(52) U.S. Cl.
USPC ............................................. 380/44; 708/250

(58) Field of Classification Search
USPC ............................................................ 380/44
See application file for complete search history.

(56) References Cited

U.S. PATENT DOCUMENTS

| | | | |
|---|---|---|---|
| 7,653,197 B2 * | 1/2010 | Van Dijk | 380/44 |
| 2007/0149135 A1 * | 6/2007 | Larsson et al. | 455/67.13 |
| 2007/0165845 A1 * | 7/2007 | Ye et al. | 380/30 |
| 2007/0177729 A1 | 8/2007 | Reznik | |
| 2011/0116436 A1 * | 5/2011 | Bachu et al. | 370/312 |

FOREIGN PATENT DOCUMENTS

| | | |
|---|---|---|
| EP | 2312789 | 4/2011 |
| WO | 97/49123 | 12/1997 |

OTHER PUBLICATIONS

Ziv. "On Universal Quantization" IEEE Transactions on Information Theory, vol. 31, May 3, 1985, pp. 1-4.*
Carrington et al., "Signal Processing" Staffordshire University Faculty of Engineering and Advanced Technology, 2008 pp. 1-11.*
Kitaura A et al.: "A Scheme of Private Key Agreement Based on the Channel Characteristics in OFDM Land Mobile Radio", Electronics & Communications in Japan, Part III—Fundamentalelectronic Science, Wiley, Hoboken, NJ, US, vol. 88, No. 9, Part 03, Jan. 1, 2005, pp. 1-10, XP001229821.

* cited by examiner

*Primary Examiner* — Lisa Lewis
(74) *Attorney, Agent, or Firm* — Dirk Brinkman; Gene Vinokur

(57) ABSTRACT

The first and second nodes in a wireless network estimate first and second channel response. The first node quantizes the first channel response to produce a first bit sequence, and a feed-forward message, which is transmit as a feed-forward message to the second node. The second node quantizes the second channel response using the feed-forward message to produce and an estimate of the first bit sequence, a second bit sequence and a feed-back message, which is transmitted to the first node. Then, the first and second nodes delete bits in the respective bit sequences using the feed-back and feed-forward message to generate first and second private keys with low bit mismatch rate.

9 Claims, 5 Drawing Sheets

METHOD FOR GENERATING PRIVATE KEYS IN WIRELESS NETWORKS

FIELD OF THE INVENTION

This invention relates generally to wireless communications, and more particularly to encrypting and decrypting data using private keys.

BACKGROUND OF THE INVENTION

Security in Wired and Wireless Networks

In wired communication networks, signals are mostly confined in physical transmission media, such as conductive wires and optical fibers. Hence, an eavesdropper can only access the signals by physically attaching to the media.

In contrast as shown in FIG. 1, signals 105 in a wireless network 100 are broadcast by a transmitter node (Alice) 101 over wireless channels. The signals are accessible to any receiver node, e.g., a legitimate user Bob 102 and an eavesdropper Eve 103, within a certain radio propagation range 110. Therefore, security is an extremely important issue in wireless communications.

Public-Key Cryptography

To achieve secure wireless communication, public key cryptography is widely used. The asymmetric structure of the keys does not require a perfectly secure wireless channel to exchange a pair of keys between the transmitter and the receivers. The pair of keys includes a private key and a public key. To operate the network, a public key infrastructure (PKI) generates, distributes and maintains the public keys, in which a trusted party, i.e., a certificate authority (CA), binds all the public keys with a receiver identity and issues a public key certificate to the receiver.

To establish secure wireless communication, the transmitter first verifies the public key certificate of the receiver. After the public key is verified, data are then encrypted using the receiver's public key. The data can only be decrypted using the corresponding private key.

However, for many wireless networks, access to the PKI is difficult, or completely unavailable. In such cases, secure communication in wireless networks becomes challenging. Given this, guaranteeing security in a wireless network is of great interest to users of wireless networks.

Channel Reciprocity

FIG. 2 shows the concept of conventional wireless channel reciprocity 200. The principle of channel reciprocity states that channels between two wireless nodes are reciprocal, i.e., the channel 201 from Alice 101 to Bob 102 has substantially the same characteristics as the channel from Bob to Alice 202, i.e., $H_{ab}=H_{ba}$, for a predetermined frequency range at a predetermined time instance.

The reciprocity of wireless channels enables two nodes to generate private keys based on the channel responses of the reciprocal channels. However, due to noise, interference and hardware impairments, the channels are not perfectly correlated. Therefore, private keys generated independently by the nodes do not always match. If a conventional cryptography technique is used for data to be transmitted, the two keys must be identical, or otherwise the receiver cannot decrypt the data correctly.

Therefore, it is desired that each key has a low bit mismatch rate (BMR). The BMR is defined as a ratio between the number of mismatched bits to the total number of bits in each key.

SUMMARY OF THE INVENTION

Embodiments of the invention provide a method for a first wireless node (user) and a second wireless node (user) to independently generate respective private keys and that have a low bit mismatch rate (BMR) by quantizing correlated signal sources and using public message exchanges.

Each wireless node first independently estimates the channel response H to the other node. The first node quantizes the channel response to produce a first bit sequence and a feed-forward message, and transmits the feed-forward message to the second node via a public channel.

The second node quantizes the channel response based on the received feed-forward message. The second node generates a second bit sequence and a corresponding feed-back message, which is transmitted to the first node via the public channel. Based on the feed-forward and the feed-back message, the nodes deleted selected bits in the first and second bit sequences to produce respective private keys.

DETAILED DESCRIPTION OF THE PREFERRED EMBODIMENTS

Method Overview

Figure 1:
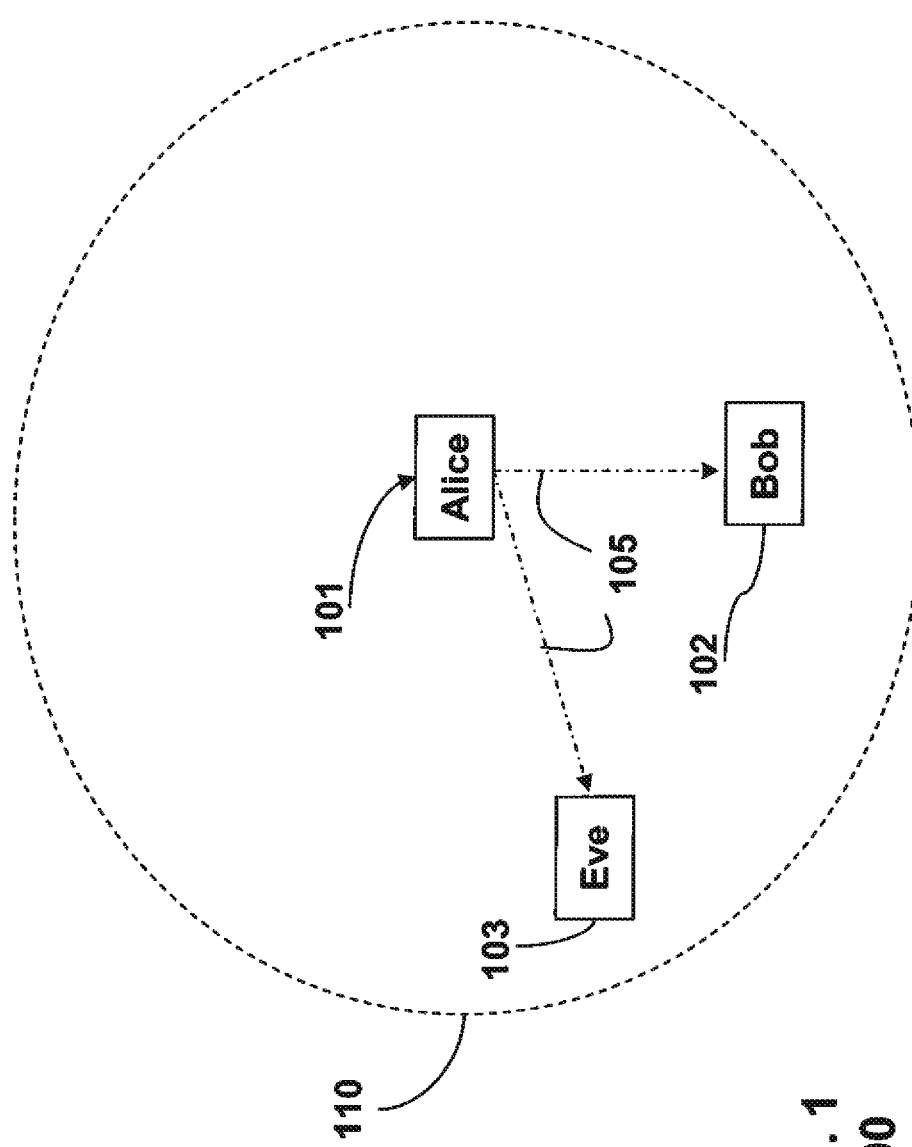
FIG. 1 is a schematic of a conventional wireless network.
Figure 2:
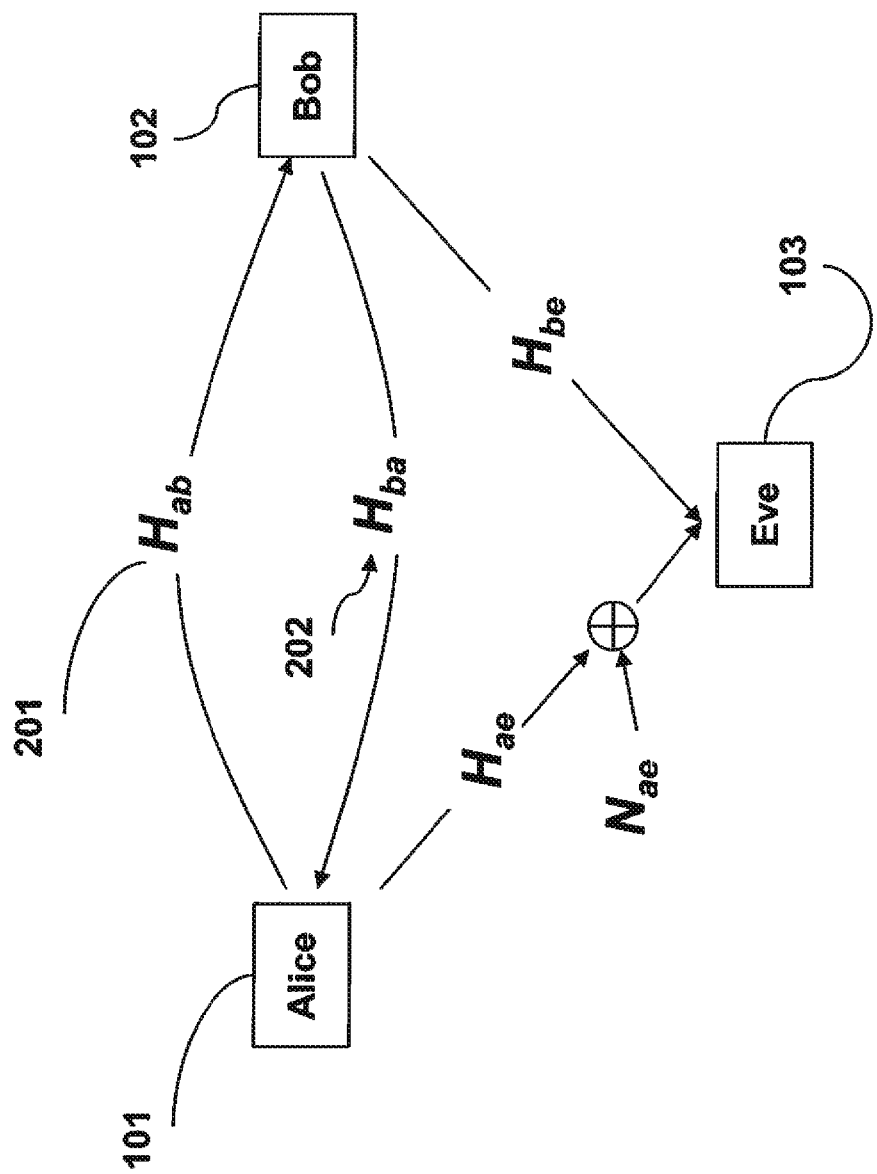
FIG. 2 is a schematic of conventional reciprocal wireless channels.
Figure 3:
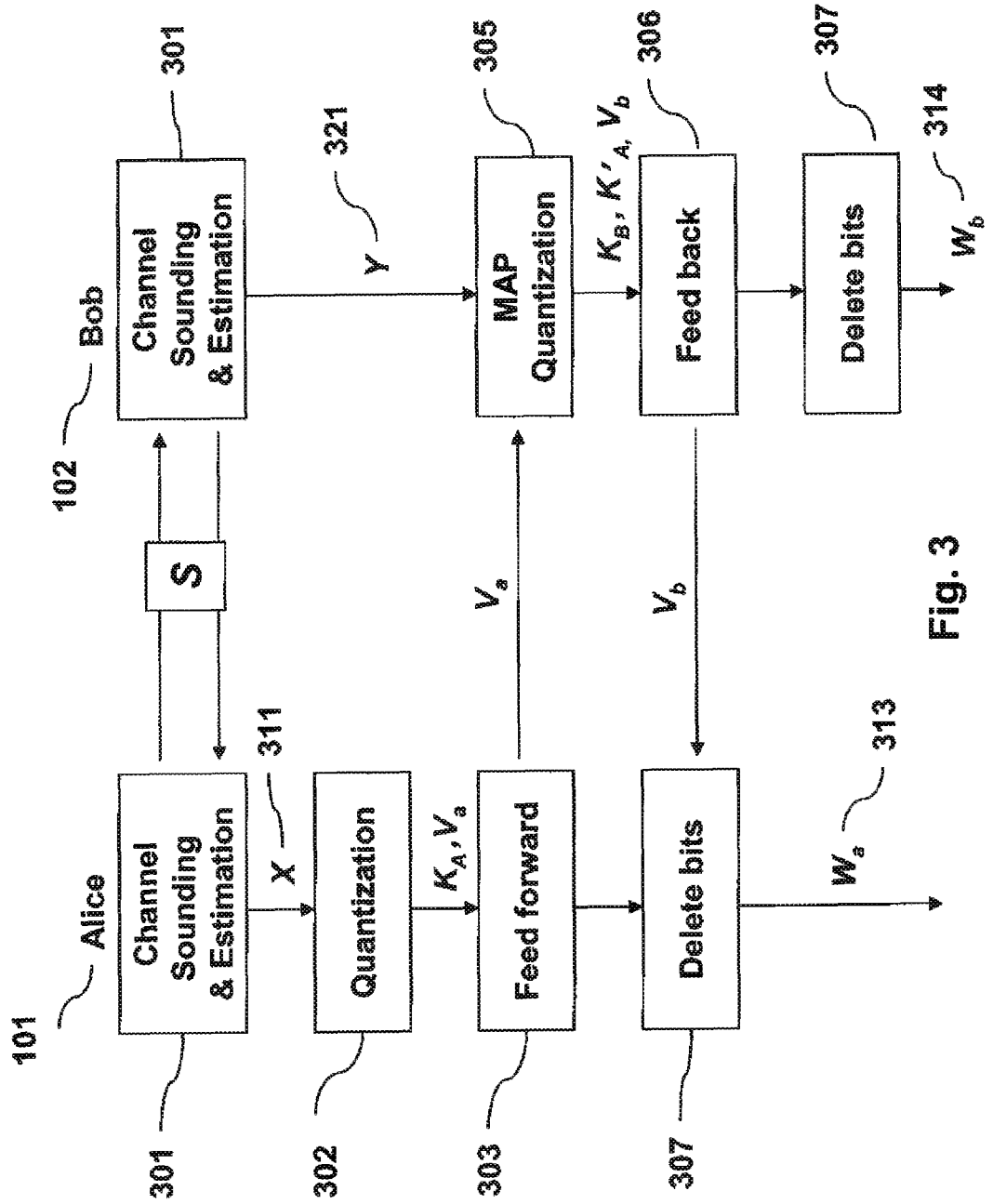
FIG. 3 is a flow chart of a method for generating private keys according to embodiments of the invention.

As shown in FIG. 3, the embodiments of our invention provide a method for generating private keys to encrypt and decrypt data to be transmitted in a wireless network. The method is described by the steps taken by a first node (user Alice) 101 and a second node (user Bob) 102.

During channel sounding and estimating 301, Alice 101 and Bob 102 estimate the response of the channel between the nodes. In one embodiment of the invention, Alice and Bob each transmit a known sounding signal S. When Alice transmits S, Bob receives S and estimates the channel parameters. When Bob transmits S, Alice receives S and estimates the channel parameters.

Due to the noise and hardware impairment, the received signals by Alice and Bob can be expressed respectively as follows:

$$R_a = H_{ba} * S + Z_a, \text{ and } R_b = H_{ab} * S + Z_b,$$

where * is a convolution operator, $N_{ab}$ 201 and $H_{ba}$ 202 can be vectors, with elements correspond to the channel response for a predetermined transmitter, receiver, frequency, and time. The channel reciprocity states that $H_{ab}=H_{ba}$, and $Z_a$ and $Z_b$ denote noise.

The sounding signals S transmitted by Alice and Bob can also be different as long as the signals are known at the receiver. The sounding signal S can be transmitted multiple times to improve the signal-to-noise ratio (SNR).

Based on the received signal, Alice and Bob estimate the channel independently: The estimated channels are $\hat{H}_{ba}$ and $\hat{H}_{ab}$ respectively as $$\hat{H}_{ba} = H_{ba} \eta_a,$$

$$\hat{H}_{ab} = H_{ab} \eta_b,$$

where $\eta_a$ and $\eta_b$ represent the channel estimation errors at Alice and Bob, respectively.

Then, Alice and Bob determine channel parameters X 311 and Y 321 as a function of the channel estimates $\hat{H}_{ba}$ and $\hat{H}_{ab}$. The parameters can be simply $\hat{H}_{ba}$ and $\hat{H}_{ab}$, or extracted parameters such as the channel gains, phases at predetermined frequencies, statistical parameters associated with the channel gains, or combinations thereof. If the total number of measurements is n, then the channel parameters X and Y are two length-n bit sequences $X^n$ and $Y^n$, respectively, which can be expressed as:

$$X^n = f(\hat{H}_{ba}) = G + F_A,$$

$$Y^n = f(\hat{H}_{ab}) = G + F_B,$$

where $G \sim \mathcal{N}(0, P)$, $F_A \sim \mathcal{N}(0, N_A)$ and $F_B \sim \mathcal{N}(0, N_B)$ denote the extracted parameter from noise-free channel responses, the estimation error at Alice and the estimation error at Bob, respectively. For simplicity, we consider the case of $N_A = N_B = N$.

Alice quantizes 302 the bit sequence X using, e.g., a scalar equiprobable quantizer. The level of quantization L is predetermined. The boundaries for an $L=2^l$-level quantization are $(q_0, q_1], (q_1, q_2], \ldots, (q_{L-1}, q_L]$. These are selected such that $$Q(q_i) \triangleq \int_{q_i}^{\infty} \frac{1}{\sqrt{2\pi}} \exp\left(-\frac{x^2}{2}\right) dx = \frac{L-i}{L},$$

The quantizer further partitions each interval $(q_{i-1}, q_i]$ into $M = 2^m$ sub-regions to generate an m-bit feed-forward message based on the bit sequence X. Therefore, the input channel response is quantized into l+m bits, where l bits are in the original bit sequence and m bits are part of the feed-forward message $V_a$.

Alice transmits 303 the m-bit feed-forward message $V_a$ to Bob.

After Bob receives the feed-forward message $V_a$, Bob quantizes 305 the bit sequence Y using, e.g., a Maximum a posteriori Probability (MAP) equalizer, which is expressed as $$T_{bi} = \mathrm{argmax} Pr(\beta X_i \in (q_j, q_{j+1}] | Y_i = y_i, V_{ai} = v_{ai}),$$

for i=1, 2, ..., n, where β is a power normalization factor. The MAP quantization process also produces a feed-back message $V_b$, which is transmitted 306 to Alice.

In the final steps 307, both Alice and Bob produce respective private keys 313-314 by deleting bits from the original sequences using the feed-back and feed-forward messages.

Feed-Forward and Feed-Back Message

The generation of feed-forward and feed-back bits is illustrated in detail in the following.

Figure 4:
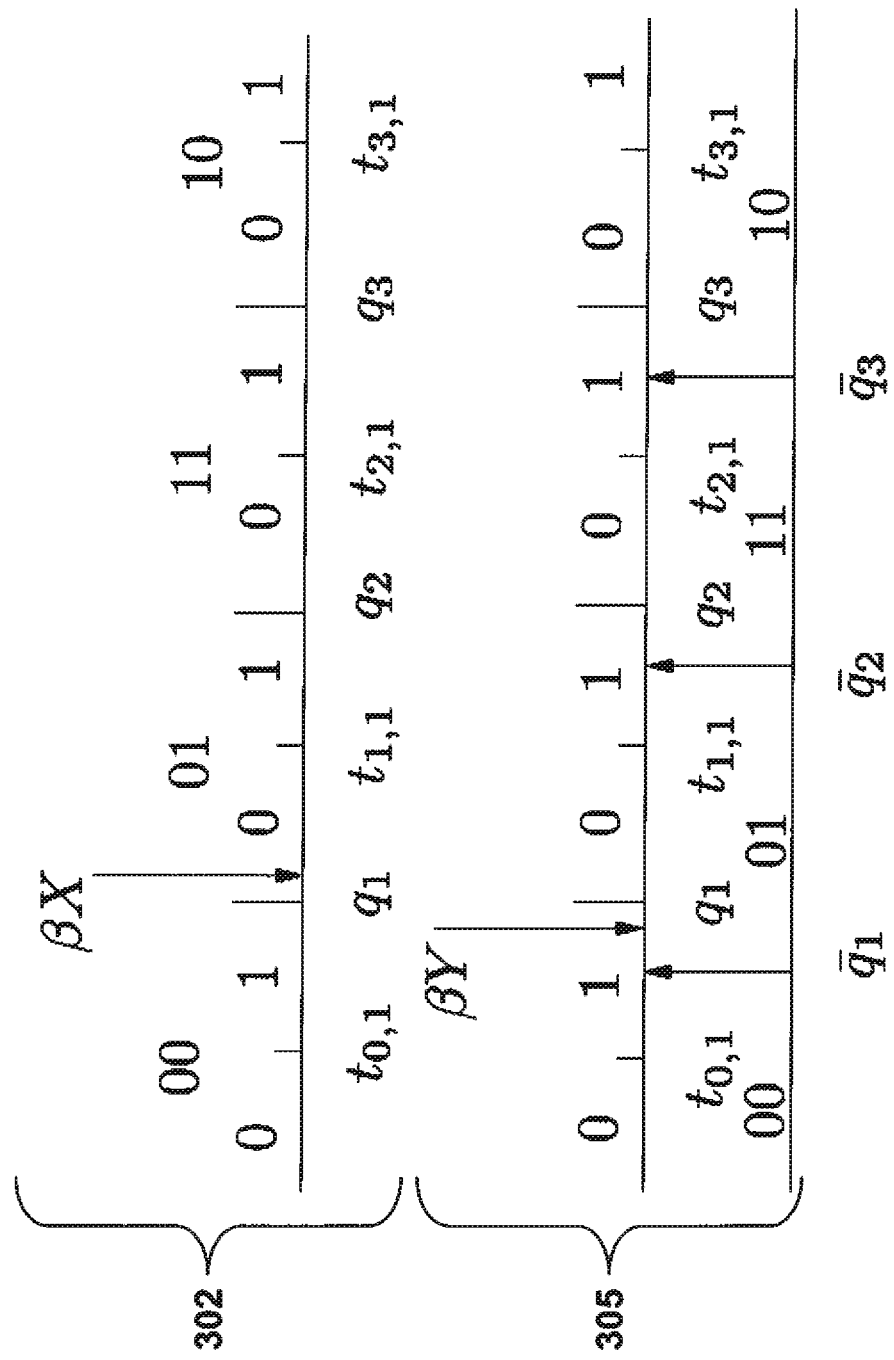
FIG. 4 is a flow chart of quantization process according to embodiments of the invention.

FIG. 4 shows details of the quantization processes 302 and 305 by Alice and Bob, respectively. The quantization level L and the feed-forward level M. are pre-determined parameters. In one embodiment of the invention, both Alice and Bob use the scalar equiprobable quantizer designed for a zero-mean and unit-variance Gaussian random variable, i.e., for an L-level quantizer, the quantization boundary $q_i$ to indicate L intervals, $(q_0, q_1], (q_1, q_2], \ldots, (q_{L-1}, q_L]$, is selected such that $$Q(q_i) \triangleq \int_{q_i}^{\infty} \frac{1}{\sqrt{2\pi}} \exp\left(-\frac{x^2}{2}\right) dx = \frac{L-i}{L},$$

for any $i \in Z_L$, where $Q(\bullet)$ denotes a Gaussian tail function and $Z_L = \{0, 1, \ldots, L-1\}$ denotes an integer set. As an example, we set $q_0 = -\infty$ and $q_L = \infty$. Gray coding is used for mapping the quantizer indices to bits, e.g., if L=4, the four quantization intervals are mapped to 00, 01, 11, and 10, respectively as shown in FIG. 4.

For generating the feed-forward message, each quantization interval $(q_{i-1}, q_i]$ is further partitioned into m sub-intervals, $(t_{i-1,0}, t_{i-1,1}], (t_{i-1,1}, t_{i-1,2}], \ldots, (t_{i-1,m-1}, t_{i-1,m}]$, where $t_{i-1,0} = q_{i-1}$ and $t_{i-1,m} = q_i$, such that each sub-interval $(t_{i-1,k}, t_{i-1,k+1}]$ for $k \in Z_m$ has an identical probability of $$Q(t_{i-1,k}) - Q(t_{i-1,k+1}) = \frac{1}{mL}.$$

Given each channel estimate $X_i$ and $Y_i$ for any $i \in \mathcal{N} = \{1, \ldots, n\}$, Alice and Bob individually quantize the estimates into $\log_2(L)$-bit indices $K_{A,i}$ and $K_{B,i}$, using the L-level scalar equiprobable quantizer. Note that the quantization is performed with a power normalization to have unity variance for quantizing data. The quantized data at $i \in \mathcal{N}$ are then given by $$K_A(i) = \{j : \beta x_i \in (q_j, q_{j+1}]\}$$

$$K_B(i) = \{j : \beta y_i \in (q_j, q_{j+1}]\}.$$

After n observations, Alice and Bob obtain bit sequences $K_A = [K_A(1), K_A(2), \ldots, K_A(n)]$ and $K_B = [K_B(1), K_B(2), \ldots, K_B(n)]$, respectively. Both are $n \times \log_2(L)$-bit long.

Alice also generates the $\log_2(m)$-bit feed-forward message $V_a(i)$ from $X_i$ such that $V_a(i)$ is the sub-interval index of the interval $K_A(i)$, more specifically, we can write $V_a(i)$ as follows:

$$V_a(i) = \{j : \beta x_i \in (t_{K_A(i), j}, t_{K_A(i), j+1}]\}.$$

Alice transmits the $n \times \log_2(m)$-bit feed-forward message $V_a = [V_a(1), V_a(2), \ldots, V_a(n)]$ to Bob, where each sub-interval index $V_a(1)$ can be expressed by its binary natural code representation with $\log_2(m)$ bits.

After receiving the feed-forward message $V_a$ from Alice, and his own observation $Y^n$, Bob carries out a Maximum a Posteriori Probability (MAP) estimation of $K'_A$. In the MAP estimation, for each $Y_i = y_i$ and $V_{ai} = v_{ai}$ (for any $i \in \mathcal{N}$), Bob searches for the index $j_{i1}$ such that the following condition is satisfied:

$$j_{i1} = \underset{j \in \mathbb{Z}_L}{\mathrm{argmax}} Pr(\beta X_i \in (q_j, q_{j+1}] | Y_i = y_i, V_{ai} = v_{ai}).$$

With the MAP estimate $j_{i1}$ and the original quantized data $K_B(i)$, Bob generates the feed-back message $V_b(i)$ which is set to be one if $j_{i1}$ and $K_B(i)$ do not match (i.e., $j_{i1} \neq K_B(i)$), and zero otherwise, for each $i \in \mathcal{N}$. The feed-back message $V_b = [V_b(1), V_b(2), \ldots, V_b(n)]$ of n bits is transmitted to Alice.

Based on the feed-back message $V_b$, Alice deletes 307 the corresponding $K_A(i)$ if $V_b(i) = 1$, for $i \in \mathcal{N}$, and sets the remaining as her private key $W_A$. Similarly, for each $i \in \mathcal{N}$, Bob also deletes 207 the corresponding bits $K_B(i)$ if $V_b(i) = 1$, and produce his private key $W_B$ using the remaining bits.

The key-generation and deletion of the mismatched bits can be summarized as follows.

1) Alice generates the key $K_A$ based on her received observation. Alice also generates a feed-forward message $V_a$ based on her received observation and the generated key $K_A$. Alice sends the feed-forward message $V_a$ to Bob.
2) Bob estimates the key $K_B$ based on his received observation. Bob uses the message $V_a$ and his estimate of the channel response to produce a MAP estimate $K'_A$ of the key $K_A$.
3) Bob compares his MAP estimate $K'_A$ of $K_A$ with $K_B$, and generates the feed-back message $V_b$. The feed-back sequence has value 'one' at the locations where the MAP estimate $K_A$ and $K_B$ do not match. At the locations where the MAP estimate $K_A$ and $K_B$ match, $V_b$ has value 'zero'.
4) Bob sends the feed-back message $V_b$ to Alice. Bob also deletes the bits in his key $K_B$ at locations where $V_b$ has value 'one.' The remaining bits of $K_B$ are sets as his private key.
5) Alice deletes the bits in her key $K_A$ at locations where $V_b$ has value 'one.' The remaining bits of $K_A$ are sets as her private key.

Universal Quantization

Figure 5:
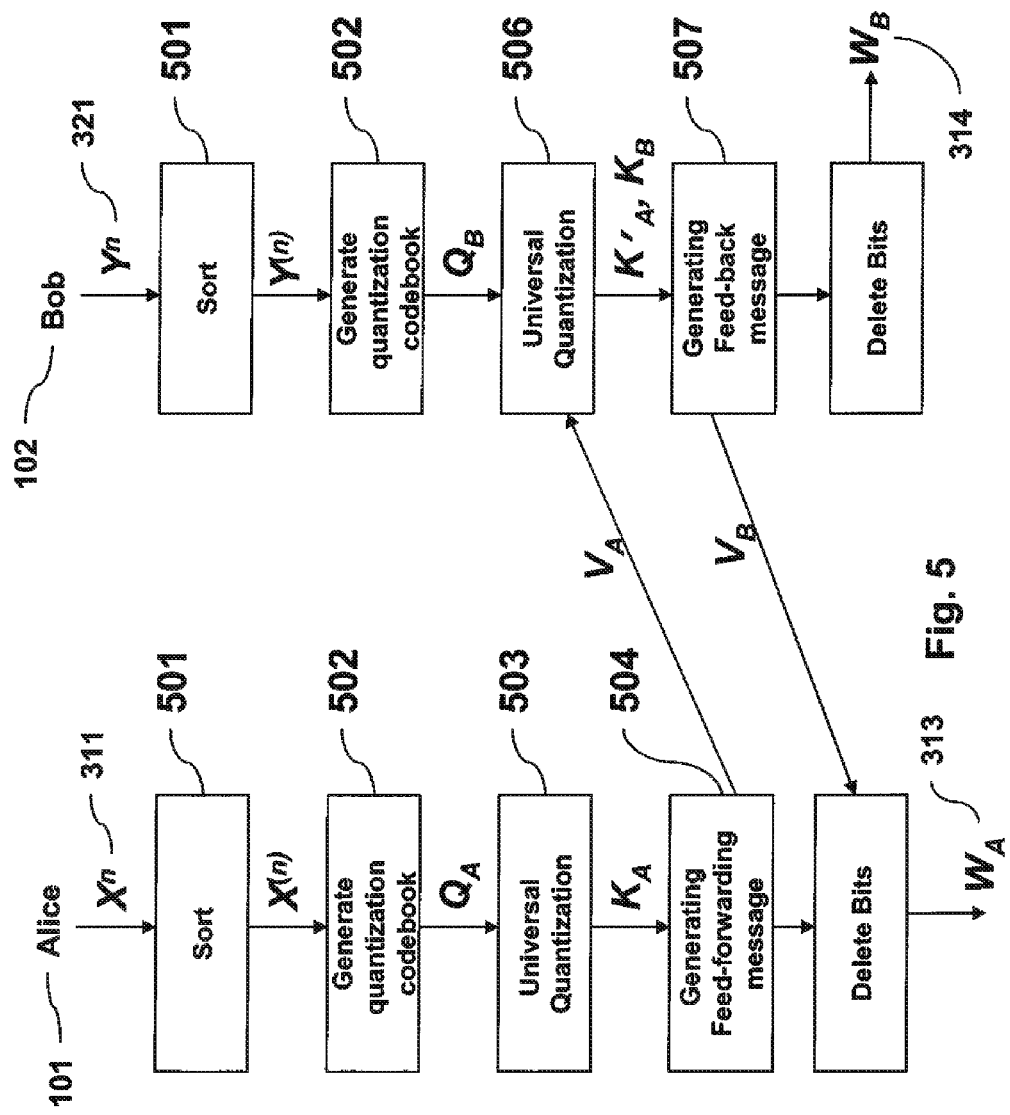
FIG. 5 is a flow chart of a universal quantization process according to embodiments of the invention.

In another embodiment of the invention as shown in FIG. 5, a universal quantization is used, which does not require prior knowledge of the distributions of X and Y.

Alice receives the input channel parameters X 311, and sorts 501 the channel parameters $X^n = [X_1, X_2, \ldots, X_n]$ in an ascending order, and partitions the sorted parameters into L intervals with each interval containing an equal number of the parameters $X_{(i)}$, and then selects quantizing boundaries in an ascending order to generate 502 a first quantization codebook as $Q_A = \{q_0, q_1, \ldots, q_L\}$, i.e., $q_0 = X_{(1)}$, $q_1 = X_{(\lfloor n/L \rfloor)}$, ..., $q_L = X_{(n)}$.

Bob similarly sorts 501 his input 321 and generates 502 a second quantization codebook $Q_B$. $Q_A$ and $Q_B$ are not necessarily identical.

Alice and Bob obtain $K_A$ and $K_B$ respectively by universal quantization 503 of the inputs X and Y using the codebooks $Q_A$ and $Q_B$, respectively. Alice generates the feed-forward message $V_A$ using the same universal equiprobable quantizer principle, i.e., sorting the parameters within a predetermined interval in ascending order and then partitioning the parameters in M sub-intervals to produce the m-bit feed-forward message $V_{A(i)}$ for $X_{(i)}$, based on the corresponding sub-interval Bob generates the feed-back message $V_B$ as follows. For each $i \in \mathcal{N}_a$, using the feed-forward message $V_{ai} = v_{ai}$, Bob determines his estimation of Alice's index by $j_{i1} = j \in Z_L$, if $y_i \in (\bar{q}_j, \bar{q}_{j+1})$, where $$\bar{q}_j = \begin{cases} \mathrm{median}[t_{j-1,v_{ai}+1}, t_{j,v_{ai}}), & 1 \le j \le L-2, \\ -\infty, & j = 0, \\ \infty, & j = L-1. \end{cases}$$

Then, Bob sets $V_{b(i)} = 0$ if $j_{i1} = K_{B(i)}$ and $V_{b(i)} = 1$ otherwise, for each $i \in \mathcal{N}_a$.

The median in the above equation can be replaced by the mean.

EFFECT OF THE INVENTION

The invention provides a method for generating private keys to encrypt and decrypt data to be transmitted in a wireless network. The keys are generated independently based on sounding signals exchanged between two nodes. The private keys have a low bit mismatch rate (BMR) by quantizing correlated signal sources and using public message interchanges.

By transmitting the feed-back and feed-forward messages between two nodes, the BMR can be reduced, e.g., at 20 dB SNR, the BMR is reduced by 40%. The universal quantizer achieves a similar performance as the MAP equalizer when the sources have Gaussian distribution. The universal quantizer has better BMR performance when the source distribution is uniform.

It is to be understood that various other adaptations and modifications may be made within the spirit and scope of the invention. Therefore, it is the object of the appended claims to cover all such variations and modifications as come within the true spirit and scope of the invention.

We claim:

1. A method for generating private keys to encrypt and decrypt data to be transmitted in a wireless network including a first node and a second node, comprising:
   estimating, in the first node, a first channel response to the second node;
   estimating, in the second node, a second channel response to the first node;
   quantizing, in the first node, the first channel response to produce a first bit sequence and a feed-forward message during the quantizing, wherein, the feed-forward message includes n×m bits, which are generated by partitioning each quantization level into $2^m$ sub-regions, and n is a number of measurement of the first channel response;
   transmitting the feed-forward message to the second node;
   quantizing, in the second node, the second channel response using the feed-forward message to produce an estimate of the first bit sequence, a second bit sequence and a feed-back message, wherein the n×m bits are used in a maximum a posteriori probability equalizer;
   transmitting the feed-back message to the first node;
   deleting, in the first node, bits in the first bit sequence using the feed-back message to generate a first private key; and
   deleting, in the second node, bits in the second hit sequence using the feed-forward message to generate a second private key.

2. The method of claim 1, wherein a bit mismatch rate of the private keys is reduced.

3. The method of claim 1, further comprising:
   transmitting sounding signals to estimate the first channel response and the second channel response.

4. The method of claim 1, wherein the first channel response and the second channel response are based on channel gains, phases at predetermined frequencies, statistical parameters associated with the channel gains, or combinations thereof.

5. The method of claim 1, wherein the first node uses a scalar equiprobable quantizer for the quantizing, and the second node uses the maximum a posteriori probability equalizer for the quantizing.

6. The method of claim 5, wherein the scalar equiprobable quantizer is performed with power normalization.

7. The method of claim 1, wherein the first node and the second node use universal quantization and codebooks for the quantizing.

8. The method of claim 7, further comprising:
   sorting first channel parameters $X^n = [X_1, X_2, \ldots, X_n]$ of the first channel response in an ascending order, and partitions the sorted first channel parameters into L intervals Wherein each interval contains an equal number of the first parameters $X_{(i)}$;

selecting, quantizing boundaries in an ascending order to generate a first quantization codebook as $Q_A=\{q_0, q_1, \ldots, q_L\}$, where $q_0=X_{(1)}, q_1=X_{(\lfloor n,I \rfloor)}, \ldots, q_L=X_{(n)}$;

sorting second channel parameters $Y^n=[Y_1, Y_2, \ldots, Y_n]$ of the second channel response in an ascending order, and partitions the sorted second channel parameters into L intervals wherein each interval contains an equal number of the parameters $X_{(i)}$;

selecting the quantizing boundaries in an ascending order to generate a second quantization codebook as $Q_B=\{q_0, q_1, \ldots, q_L\}$, where $q_0=Y_{(1)}, q_1=Yi_{\lfloor n,I \rfloor}, \ldots, q_L=Y_{(n)}$.

9. The method of claim 1, further comprising:

determining, in the second node, mismatches between the first bit sequence and the second bit sequence to produce the feed-back message.

* * * * *